United States Patent
Iiyama et al.

(10) Patent No.: US 11,595,132 B2
(45) Date of Patent: Feb. 28, 2023

(54) SIGNAL PROCESSING APPARATUS AND OPTICAL RECEIVER

(71) Applicant: NIPPON TELEGRAPH AND TELEPHONE CORPORATION, Tokyo (JP)

(72) Inventors: Noriko Iiyama, Musashino (JP); Masamichi Fujiwara, Musashino (JP); Junichi Kani, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 64 days.

(21) Appl. No.: 17/273,282

(22) PCT Filed: Aug. 27, 2019

(86) PCT No.: PCT/JP2019/033532
§ 371 (c)(1),
(2) Date: Mar. 3, 2021

(87) PCT Pub. No.: WO2020/050101
PCT Pub. Date: Mar. 12, 2020

(65) Prior Publication Data
US 2021/0336706 A1    Oct. 28, 2021

(30) Foreign Application Priority Data
Sep. 6, 2018 (JP) .............................. JP2018-167103

(51) Int. Cl.
*H04B 10/69* (2013.01)
(52) U.S. Cl.
CPC .................................. *H04B 10/69* (2013.01)
(58) Field of Classification Search
CPC ..................................................... H04B 10/69
See application file for complete search history.

(56) References Cited

U.S. PATENT DOCUMENTS

| 4,689,806 | A | * | 8/1987 | von der Embse | ..... H03D 3/242 |
| | | | | | 375/361 |
| 5,920,220 | A | * | 7/1999 | Takao | ................... H04L 7/0054 |
| | | | | | 327/237 |

(Continued)

FOREIGN PATENT DOCUMENTS

| JP | H07221810 A | 8/1995 |
| JP | 2001203768 A | 7/2001 |

(Continued)

OTHER PUBLICATIONS

Senichi Suzuki et al., R&D on the Digital Coherent Signal Processing Technology for Large-capacity Optical Communication Networks, Journal of the Institute of Electronics, Information and Communication Engineers, vol. 95, No. 12, 2012, pp. 1100-1116.

(Continued)

*Primary Examiner* — Tanya T Motsinger

(57) ABSTRACT

An ADC (12) in an optical receiver (1) generates a sample signal composed of time series samples by oversampling a received signal that is an electrical signal converted from an optical signal by a light receiving unit (11). A symbol timing detection unit (132) of a DSP unit (13) detects a symbol timing in the sample signal. When it is determined that a symbol timing is appearing at a longer interval than a predetermined interval based on this detection result, a symbol timing adjusting unit (133) skips one or more samples included in the sample signal to read out samples at the predetermined interval, while when it is determined that the symbol timing is appearing at a shorter interval than the predetermined interval, the symbol timing adjusting unit inserts the same samples as one or more samples included in the sample signal immediately after the one or more samples to read out the samples at the predetermined interval.

15 Claims, 15 Drawing Sheets

(56) References Cited

U.S. PATENT DOCUMENTS

| | | | |
|---|---|---|---|
| 6,181,755 B1* | 1/2001 | Junell | H04L 7/042 375/365 |
| 6,990,160 B1* | 1/2006 | Abe | H04L 7/042 375/355 |
| 9,350,587 B1* | 5/2016 | Fang | H04L 27/2685 |
| 2001/0019593 A1* | 9/2001 | Greaves | H04L 27/2679 375/355 |
| 2003/0095617 A1* | 5/2003 | Lee | H04L 7/0334 375/354 |
| 2005/0174188 A1* | 8/2005 | Koyanagi | H03M 7/30 333/14 |
| 2011/0008059 A1 | 1/2011 | Chang et al. | |
| 2012/0099864 A1* | 4/2012 | Ishihara | H04B 10/0775 398/159 |
| 2013/0022351 A1 | 1/2013 | Arikawa | |
| 2013/0108276 A1* | 5/2013 | Kikuchi | H04B 10/60 398/210 |
| 2015/0222419 A1 | 8/2015 | Bachmann et al. | |
| 2019/0393910 A1* | 12/2019 | Kawamoto | H04W 24/08 |
| 2021/0258075 A1* | 8/2021 | Iiyama | H04B 3/06 |
| 2021/0336706 A1* | 10/2021 | Iiyama | H04B 10/27 |
| 2021/0399870 A1* | 12/2021 | Torbatian | H04L 27/2662 |
| 2021/0399871 A1* | 12/2021 | Arita | H04B 1/7075 |
| 2022/0038141 A1* | 2/2022 | Murakami | H04B 7/0814 |
| 2022/0091166 A1* | 3/2022 | Bickel | G01R 21/06 |

FOREIGN PATENT DOCUMENTS

| | | |
|---|---|---|
| JP | 2004165929 A | 6/2004 |
| JP | 200736976 A | 2/2007 |
| JP | 2015146570 A | 8/2015 |
| WO | WO-2011125964 A1 | 10/2011 |

OTHER PUBLICATIONS

Masafumi Nogawa et al., 10 Gbit / s Burst Mode Receiving IC Technology, NTT Technology Journal, vol. 23, No. 1, 2011, pp. 31-35.

* cited by examiner

SIGNAL PROCESSING APPARATUS AND OPTICAL RECEIVER

CROSS-REFERENCE TO RELATED APPLICATIONS

This application is a 371 U.S. National Phase of International Application No. PCT/JP2019/033532 filed on Aug. 27, 2019, which claims priority to Japanese Application No. 2018-167103 filed on Sep. 6, 2018. The entire disclosures of the above applications are incorporated herein by reference.

TECHNICAL FIELD

The present invention relates to a signal processing unit and an optical receiver.

BACKGROUND ART

Current optical subscriber access networks in Japan have a PON (Passive Optical Network) architecture as illustrated in FIG. 8 in which a plurality of subscriber devices are connected to one station-side device via optical fibers and optical couplers. FIG. 8 illustrates N subscriber devices (where N is an integer of 2 or more) each represented as Subscriber Device #1 to Subscriber Device N. This architecture allows optical fibers to be laid more economically than connecting station-side devices and subscriber devices on a one-on-one basis via optical fibers.

Multiplexing techniques are necessary for single versus multiple communications such as PONs in order to transmit and receive upstream signals from a plurality of subscriber devices to one station-side device, and downstream signals from one station-side device to the plurality of subscriber devices, without collision or signal loss. Currently used PON systems apply a TDM (Time Division Multiplexing) technique as a multiplexing technique in which the station-side device allocates an individual time slot to each subscriber device for transmission and reception, and a DBA (Dynamic Bandwidth Allocation) technique as an L2 (Layer 2) control for allocating communication time slots for upstream signals to each subscriber device. As illustrated in FIG. 9, in an upstream communication in a TDM-PON that uses DBA, each subscriber device transmits an upstream signal as a frame at the time when signal transmission is allowed. In FIG. 9, frames transmitted from Subscriber Devices #n (where n is an integer of 1 or more and N or less) are represented as Fn, and times at which frames Fn are transmitted are represented as tn. Such upstream signals have the following two characteristics.

(1) The signals received at the station-side device are intermittent (with a no-signal time between signals) rather than continuous because they have been transmitted from each subscriber device at different times.

(2) The signals received at the station-side device vary in characteristics such as signal intensity and distortion for each subscriber device that transmitted the signals because of the individual differences of frequency characteristics of respective subscriber devices and because of different conditions of transmission channels (such as distance) between each subscriber device and the station-side device.

Signals having above features are referred to as TDM-PON upstream burst signal (hereinafter, burst signal). As illustrated in FIG. 10, the frame of a burst signal (hereinafter, burst frame) is generally composed of three parts, a preamble part, a payload part, and an end-of-burst. The payload part is a real signal part. The preamble part that performs signal synchronization, equalization of received signal level, etc., is added before that, and the last end-of-burst is the time including a fall time or the like of a laser. Currently commercially available PONs use OOK (On-Off Keying) as a signal modulation method. The OOK identifies 1-bit per symbol signals by intensity of light.

Meanwhile, in view of the prospect of more advanced use of small cells in mobile communication networks for handling the rapidly increasing mobile traffic, utilization of PON techniques as an economical method of accommodating small cells is currently discussed. The conditions such as transmission distance and transmission rate are more demanding for accommodating a mobile communication traffic than an optical subscriber system, and it is considered that DD (Direct Detection) systems composed only of analog components (herein referred to as analog DD system) and adopted as the detection technique in current PONs have limitations for this application. Accordingly, techniques relating to application of detection systems that use DSP (Digital Signal Processing), which will enable support of various modulation methods an analog DD system can hardly realize, and enable compensation of transmission-induced signal distortion, to PONs, are being discussed.

The most popular detection system that uses DSP is digital coherent detection, which is a combination of digital technology and coherent detection, and it offers the advantages of using DSP mentioned above, as well as enjoys the benefit of coherent detection that is a dramatic improvement in light receiving sensitivity. Optical receivers that use digital coherent detection are already commercially available for core/metro networks and elemental technologies have been established (see, for example, NPL 1).

In any detector/receiver systems that use DSP including the digital coherent detection, what processing DSP performs differs depending on the target system, or what is to be compensated for. In general, multiple processing schemes are used in combination. For example, when a higher-order modulation system that allows transmission of signals of 2 bits or more per symbol is to be adopted, a demodulation process can be performed by DSP. Or, when DSP is combined with coherent detection, in particular intradyne detection, signal distortion (that appears in the form of signal point rotation in the IQ plane) caused by a frequency difference between the signal light and local light is compensated for through calculation by DSP. Equalization of waveform distortions for improving the minimum light receiving sensitivity is another example of processing commonly performed by an optical receiver that uses DSP.

FIG. 11 is a diagram illustrating a common configuration of an optical receiver that uses DSP, which is installed in a station-side device, for example. A light receiving unit converts a received optical signal into the electrical signal. An ADC (Analog/Digital Converter) converts the received signal that has been converted into the electrical signal into a digital signal and inputs the same to a DSP unit. The DSP unit performs various steps of signal processing to the input digital signal. The number of ADC differs depending on the configurations of the system and optical receiver such as whether polarization division multiplexing is applied or not, and whether or not there is phase information.

The ADC, in converting the input analog signal into a digital signal, oversamples the analog signal at a sampling rate m times higher than the symbol rate (m>1) as illustrated in FIG. 12. In the example of FIG. 12, m=3, and the 1 symbol interval time T in FIG. 12 equals to 1/symbol rate.

CITATION LIST

Non Patent Literature

[NPL 1] Senichi Suzuki, et al., "R & D on the Digital Coherent Signal Processing Technology for Large-Capacity Optical Communication Networks", The Journal of Institute of Electronics, Information and Communication Engineers, 2012, Vol. 95, No. 12, p. 1100-1116
[NPL 2] Masafumi Nogawa, et al., "10-Gbit/s Bâsuto Môdo Zyusin IC Gizyutu (10-Gbit/s Burst Mode Receiver Integrated Circuit for Technology)", NTT Technical Review, 2011, Vol. 23, No. 1, p. 31-35

SUMMARY OF THE INVENTION

Technical Problem

In any system that transmits signals, and not just TDM-PONs or optical transmission systems, even if a receiver and a transmitter are operating at the same predetermined clock frequency, there occurs a discrepancy in clock frequency between the transmitter and the receiver due to individual differences and characteristics, unless clock synchronization between the receiver and the transmitter is performed. In this case, the receiver receives an input of a signal generated by the transmitter operating at a clock frequency that is, strictly speaking, different from the clock frequency at which the receiver operates, so that some processing that alleviates or absorbs the influence of this difference in clock frequency is necessary. While various implementation methods of processing for dealing with clock frequency differences have been proposed, there is no method of handling a clock frequency difference applicable to burst signals when no clock synchronization is performed between a transmitter and a receiver in a TDM-PON.

In a large-capacity system such as a core/metro network, for example, optical receivers equipped in station-side devices absorb clock frequency differences by using a configuration illustrated in FIG. 13 (see, for example, NPL processing relating to absorption of clock frequency differences. In a system where clock frequencies of a transmitter and a receiver are synchronized, samples closest to the symbol timing (represented by black dots here) in each symbol are supposed to appear every m samples as illustrated in FIG. 14 in a digital signal oversampled by an ADC at a rate m times higher than the symbol rate. The symbol timing is a timing at which a signal indicative of each symbol appears. In phase modulation, for example, the intensity of the signal indicative of each symbol is substantially the same, while the intensity lowers during transition between symbols. Therefore, the samples represented by black dots are treated as symbol timing of the input digital signal.

According to the method of absorbing a clock frequency difference using the configuration illustrated in FIG. 13, the DSP calculates the timing of samples closest to the symbol timing in the signal oversampled by the ADC, and feedback control of the ADC is performed in an analog manner via a DAC (Digital/Analog Converter). This way, the ADC is synchronized with the input signal to reduce the influence of an average discrepancy in clock frequency between the transmitter and the receiver and slow fluctuations. Note, however, this method is intended for a system where communications are on a one-on-one basis and the signal keeps flowing continuously, such as core/metro networks.

In the case with TDM-PON upstream burst signals, on the other hand, the clock frequency differs for each transmission source of the burst signal, so that the clock frequency difference between each burst signal and the optical receiver varies. In order for the payload part illustrated in FIG. 10 of each burst frame to be received correctly, the operation of synchronizing the clock frequencies need to be complete in the preamble part. However, with the feedback control performed in the configuration illustrated in FIG. 13, if applied, it would take time to follow the clock frequency differences that vary for each one of the burst signals coming in one after another, and it would be necessary to make the preamble part longer. A longer preamble leads to a relatively shorter payload, which lowers the transmission efficiency. For this reason, it is not preferable to apply the sampling phase synchronizing function used in a core/metro system to TDM-PON burst signals as it is.

Another example, CDR (Clock and Data Recovery) for burst signals developed for PONs that use existing analog DD, is capable of high-speed clock extraction from a burst signal (see, for example, NPL 2). However, CDR basically presupposes the use of OOK as the modulation method and extracts a clock at the timing when the input signal level rises from low to high. Therefore, it is not applicable as it is to a signal modified by QPSK (Quadrature Phase Shift Keying) and the like, for example, that uses only phases for modulation.

As described above, the problem is that the methods of alleviating the influence of clock frequency differences that have been proposed so far, for a situation where clock frequencies of a transmitter and a receiver are not synchronized, cannot be applied as they are to TDM-PONs, and in particular to cases that presuppose demodulation by DSP using a modulation method other than OOK.

In view of the circumstances described above, an object of the present invention is to provide a signal processing unit and an optical receiver capable of compensating for a clock frequency discrepancy between a transmitter and a receiver for burst signals irrespective of modulation methods.

Means for Solving the Problem

One aspect of the present invention is a signal processing unit, including: a symbol timing detection unit that detects a symbol timing in a sample signal composed of time series samples obtained by oversampling a received signal; and a symbol timing adjusting unit that, when it is determined that a symbol timing is appearing at a longer interval than a predetermined interval based on a detection result of the symbol timing detection unit, skips one or more samples included in the sample signal to read out the samples at the predetermined interval, and when it is determined that a symbol timing is appearing at a shorter interval than the predetermined interval based on the detection result, inserts the same samples as one or more samples included in the sample signal immediately after the one or more samples to read out the samples at the predetermined interval.

One aspect of the present invention is the signal processing unit described above, wherein the symbol timing adjusting unit includes a buffer that stores the sample signal in an order of received time, a read-out buffer position determination unit that determines whether a symbol timing is appearing at a longer or a shorter interval than the predetermined interval based on the detection result, and changes a buffer position from which the sample is read out from the buffer in accordance with a determination result, and a sample read-out unit that reads out the sample from the buffer position.

One aspect of the present invention is the signal processing unit described above, further including an interpolation process unit that estimates values of samples between the samples included in the sample signal, wherein the symbol timing detection unit detects a symbol timing based on the samples included in the sample signal and the samples estimated by the interpolation process unit.

One aspect of the present invention is the signal processing unit described above, wherein the symbol timing detection unit calculates a statistic value of amplitudes of a sample group composed of samples per predetermined number of sample intervals contained in the sample signal, for each sample group shifted by one sample each, and detects the symbol timing based on a calculation result.

One aspect of the present invention is an optical receiver including: a light receiving unit that receives and converts an optical signal into an electrical signal; a conversion unit that generates a sample signal composed of time series samples obtained by oversampling the electrical signal; and one of the signal processing units above.

Effects of the Invention

The present invention enables compensation of a clock frequency discrepancy between a transmitter and a receiver for burst signals irrespective of modulation methods.

DESCRIPTION OF EMBODIMENTS

Hereinafter, embodiments of the present invention will be described in detail with reference to the drawings. This embodiment relates to a signal processing unit that receives TDM (Time Division Multiplexing) burst signals in single versus multiple communications, and an optical receiver equipped with this signal processing unit.

It is difficult to apply existing techniques of absorbing the influence of clock frequency differences between a transmitter and a receiver to TDM-PON burst signals for which DSP and phase modulation are used. For example, it is difficult to apply the feedback control of ADCs that is effective in a core/large-capacity system to the burst signals mentioned above, because it necessitates longer preambles, which leads to poorer transmission efficiency. CDR, which is a clock extraction method used in analog DD, entails the difficulty that clock extraction from the burst signals mentioned above is not possible because of the differences in characteristics of modulation signals. According to this embodiment, therefore, the signal processing unit manipulates the input signal to the optical receiver to match the sample timing of the input signal to the sample timing of the receiver system rather than extracting clocks from the input signal and synchronizing the receiver system with the clocks, to solve the problems described above.

Figure 1:
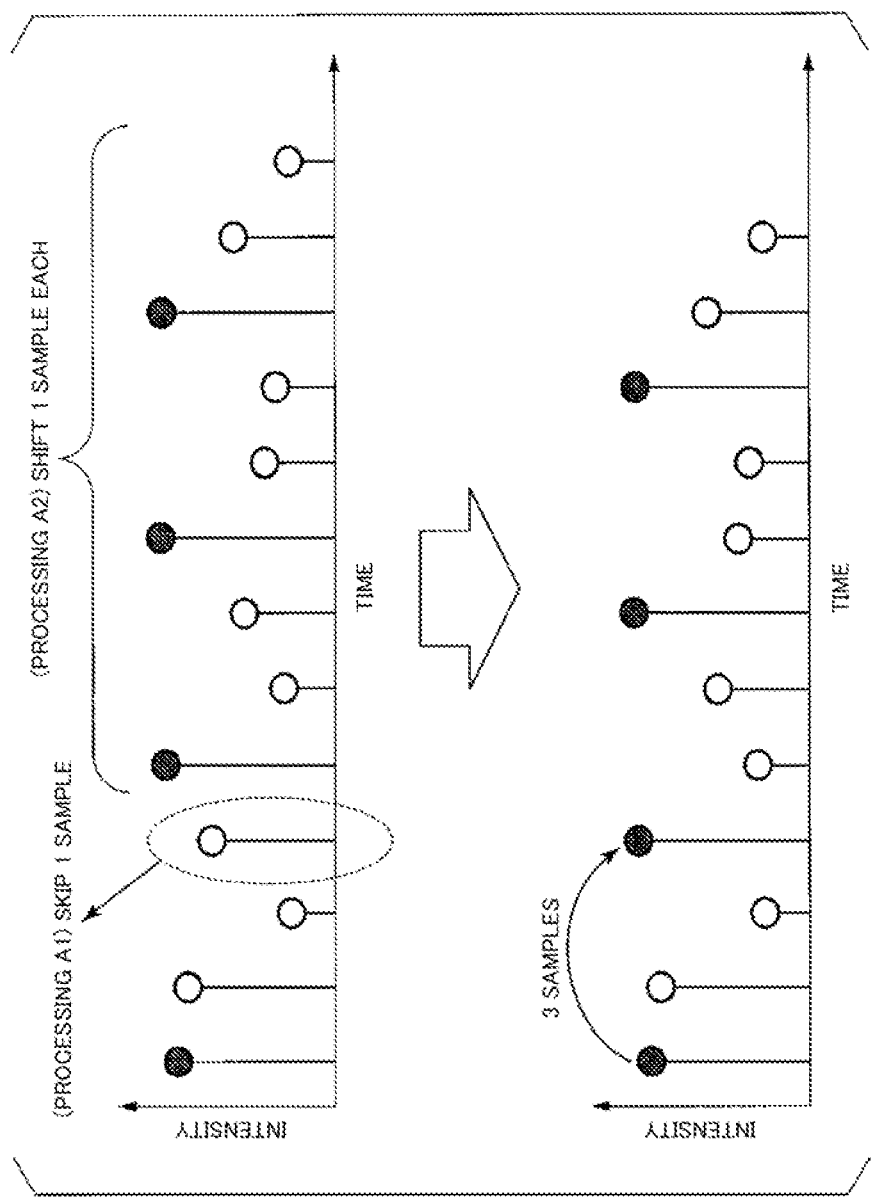
FIG. 1 is a diagram illustrating the processing performed by an optical receiver according to one embodiment of the present invention.
Figure 2:
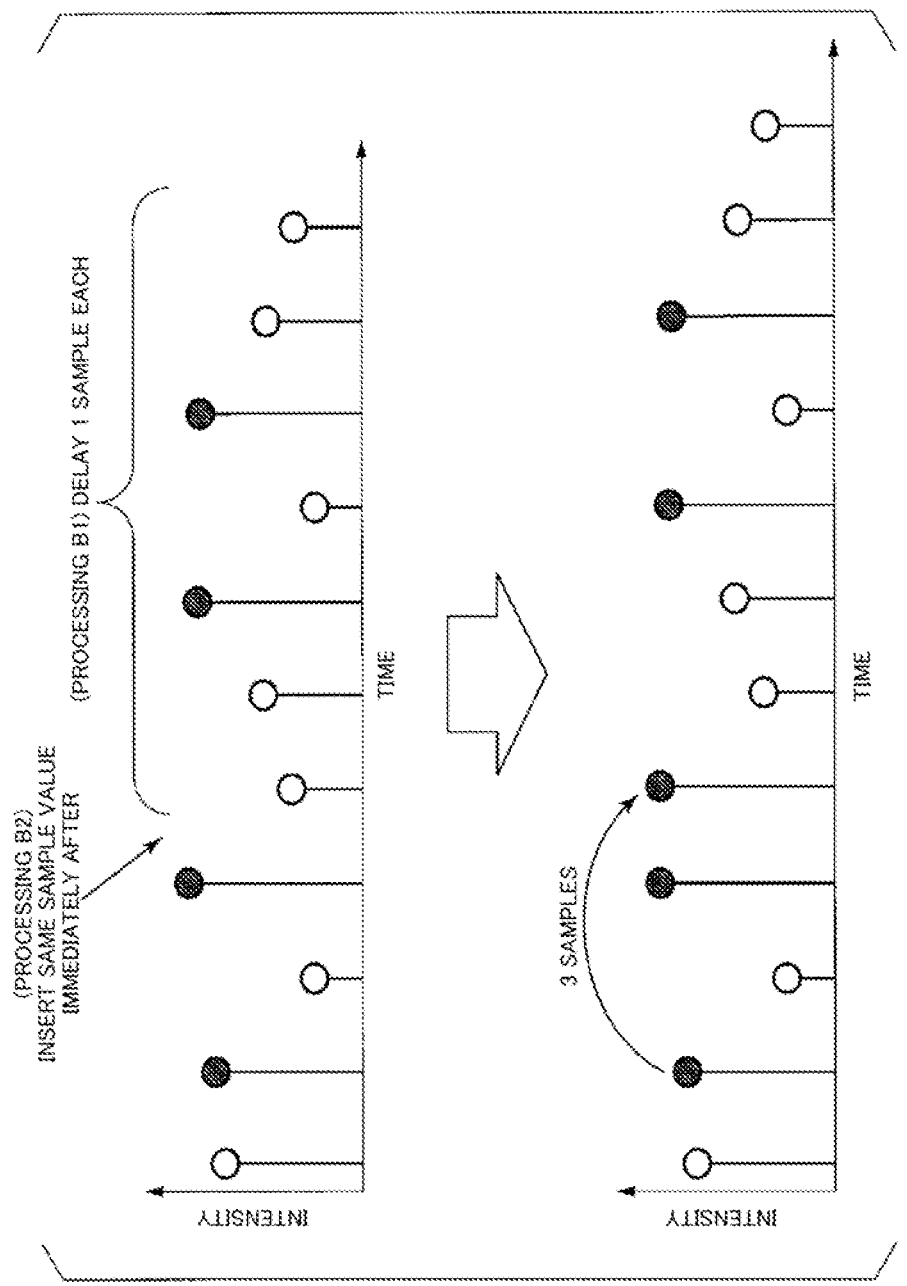
FIG. 2 is a diagram illustrating the processing performed by the optical receiver according to this embodiment.
Figure 14:
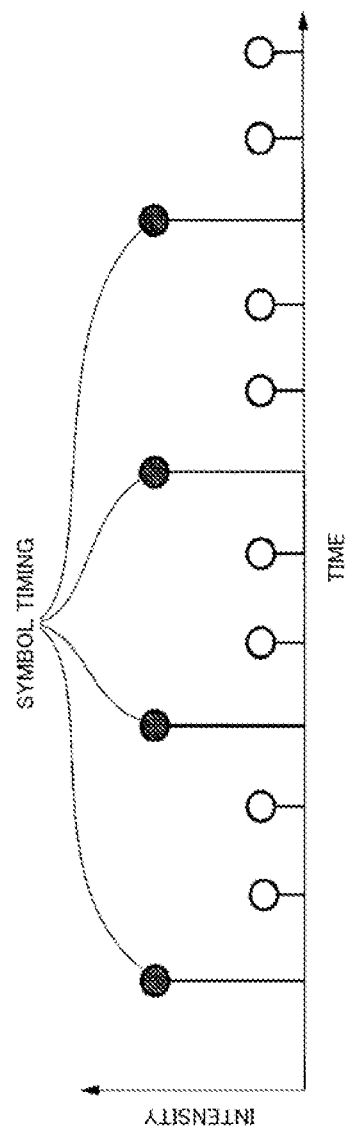
FIG. 14 is a diagram illustrating a sampling result in a system where there is a clock frequency discrepancy.
Figure 15:
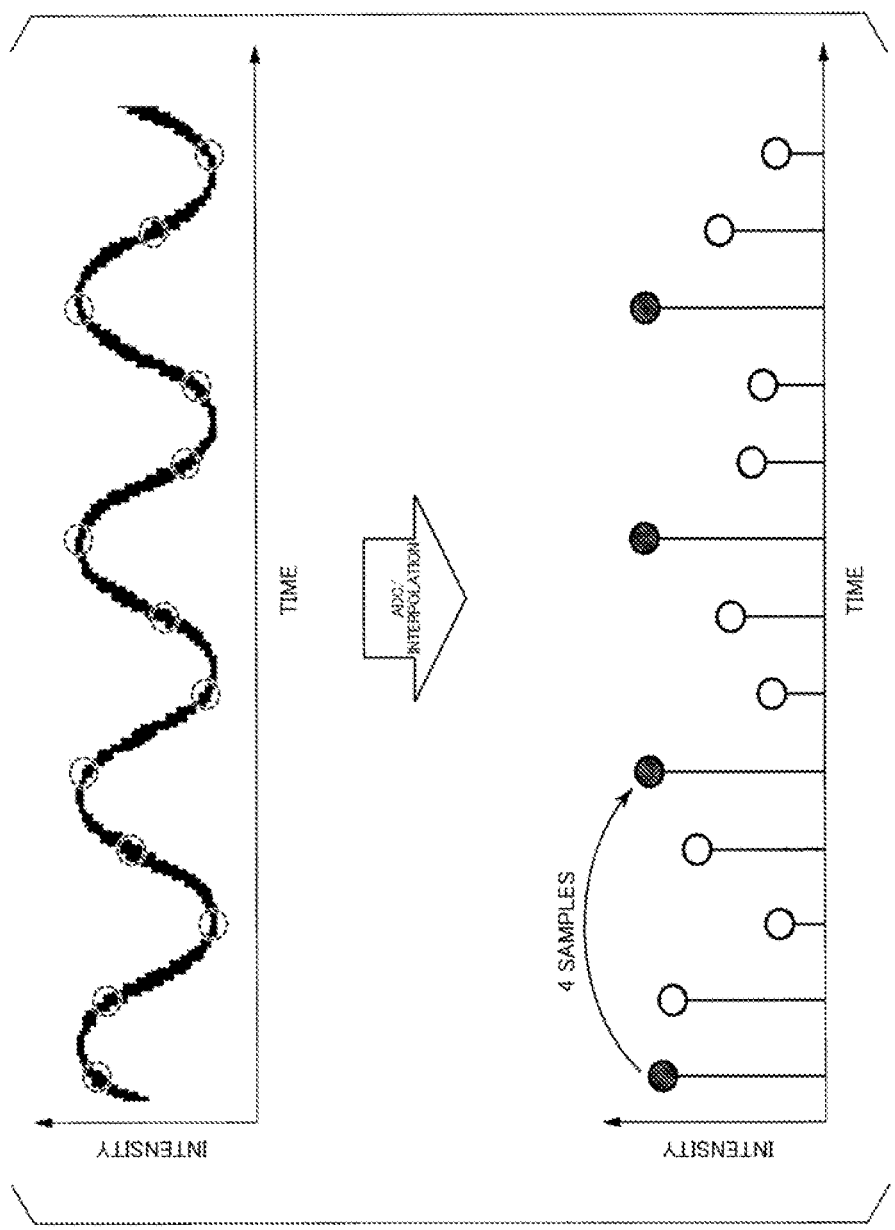
FIG. 15 is a diagram illustrating a sampling result in a system where there is a clock frequency discrepancy.
Figure 16:
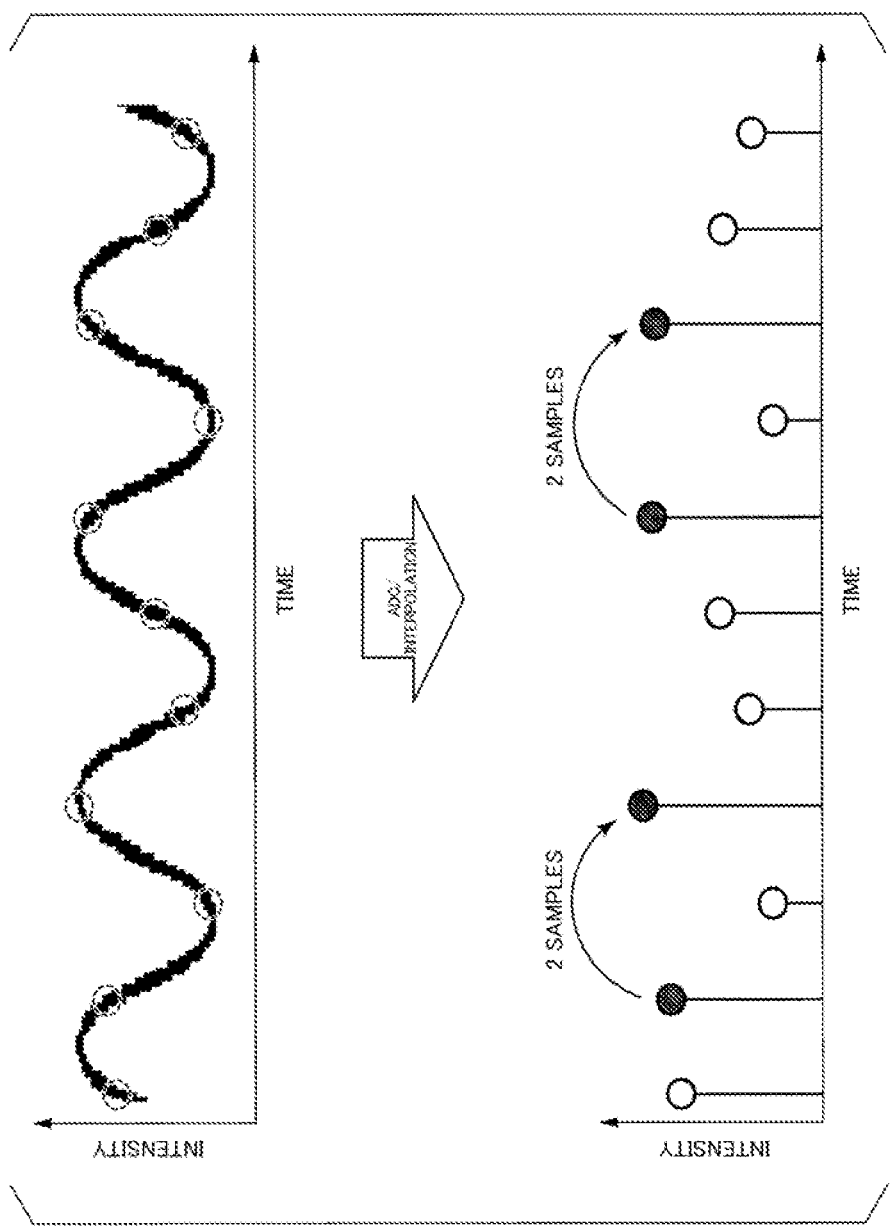
FIG. 16 is a diagram illustrating a sampling result in a system where there is a clock frequency discrepancy.

FIG. 1 and FIG. 2 are diagrams illustrating a phenomenon that occurs when a receiver performs oversampling in a system where there is a clock frequency discrepancy between a transmitter and the receiver. These diagrams illustrate a case where the sampling rate is three times higher than the symbol rate (m=3). Here it is assumed that the digital signal (sample signal) has been oversampled by the ADC of the receiver at a sampling rate three times higher than the symbol rate. If the clock frequencies of the transmitter and receiver are the same, the symbol timing originating from the digital signal should always appear in every 3 samples as illustrated in FIG. 14. On the other hand, if the clock frequency of the receiver is greater than that of the transmitter, the symbol timing may sometimes appear m+1 samples after one symbol timing. The example of FIG. 15 shows a portion where, despite the 3-times oversampling, the symbol timing appears again 4 samples after one symbol timing. Conversely, if the clock frequency of the receiver is smaller than that of the transmitter, the symbol timing may sometimes appear m−1 samples after one symbol timing. In the example of FIG. 16, the symbol timing appears again 2 samples after one symbol timing.

FIG. 1 and FIG. 2 are diagrams illustrating the processing performed by the optical receiver of this embodiment for the cases where the clock frequencies do not match as described above. The optical receiver of this embodiment performs processing in which one sample signal is skipped as illustrated in FIG. 1, or one sampling signal is duplicated as illustrated in FIG. 2. Namely, this optical receiver manipulates the sample signal so that the symbol timing always appears every m samples.

The optical receiver of this embodiment detects a situation where one symbol timing and the next symbol timing are 4 samples (m+1 samples) apart as illustrated in FIG. 15. In this case, the optical receiver of this embodiment skips one sample before the sample of the next symbol timing (processing A1) as illustrated in FIG. 1, and shifts one sample each after the skipped sample (processing A2). This way, the optical receiver can make the symbol timing appear every 3 samples (every m samples).

The optical receiver of this embodiment also detects a situation where one symbol timing and the next symbol timing are 2 samples (m−1 samples) apart as illustrated in FIG. 2. In this case, the optical receiver of this embodiment delays one sample each after the next symbol timing (processing B1) as illustrated in FIG. 2, and duplicates and inserts the same sample immediately after the sample of the next symbol timing (processing B2). This way, the optical receiver can make the symbol timing appear every 3 samples (every m samples).

The above feature thus allows the optical receiver of this embodiment to alleviate/absorb the influence caused by a difference in clock frequency between the receiver and the transmitter for TDM-PON burst signals for which DSP (Digital Signal Processing) and phase modulation are used.

Hereinafter detailed embodiments will be described.

First Embodiment

Figure 3:
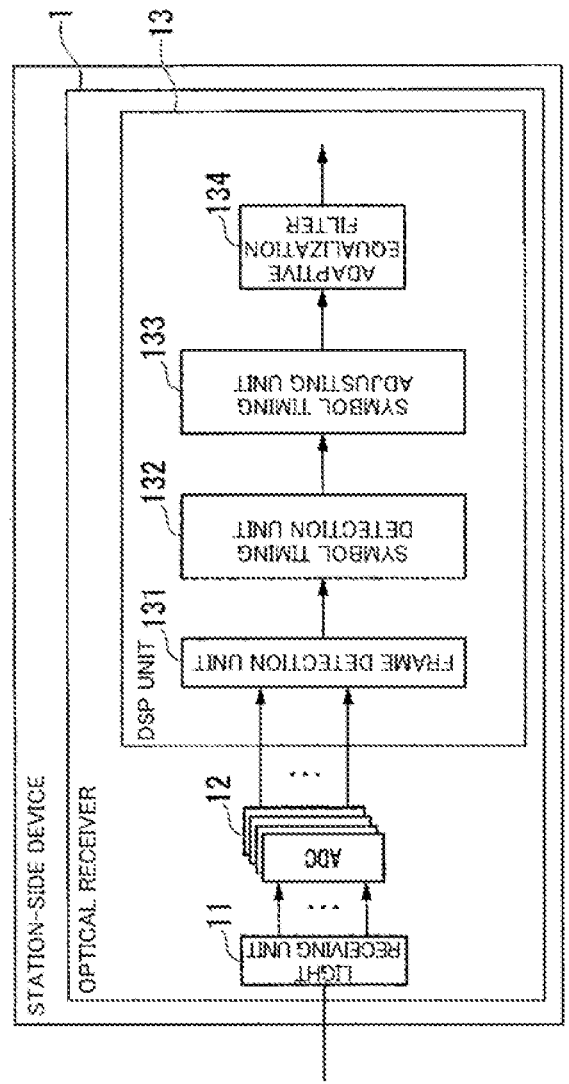
FIG. 3 is a diagram illustrating a configuration of an optical receiver according to a first embodiment.
Figure 8:
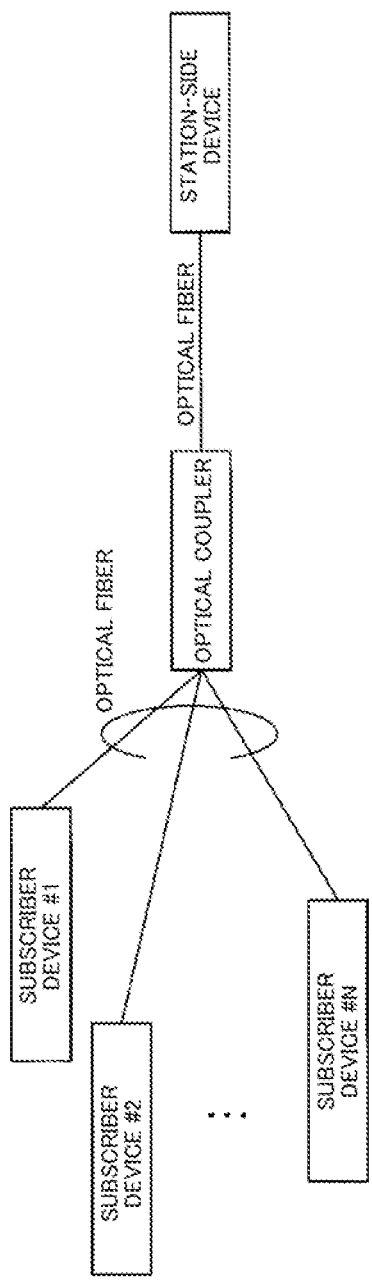
FIG. 8 is a configuration diagram of an optical subscriber access network.
Figure 9:
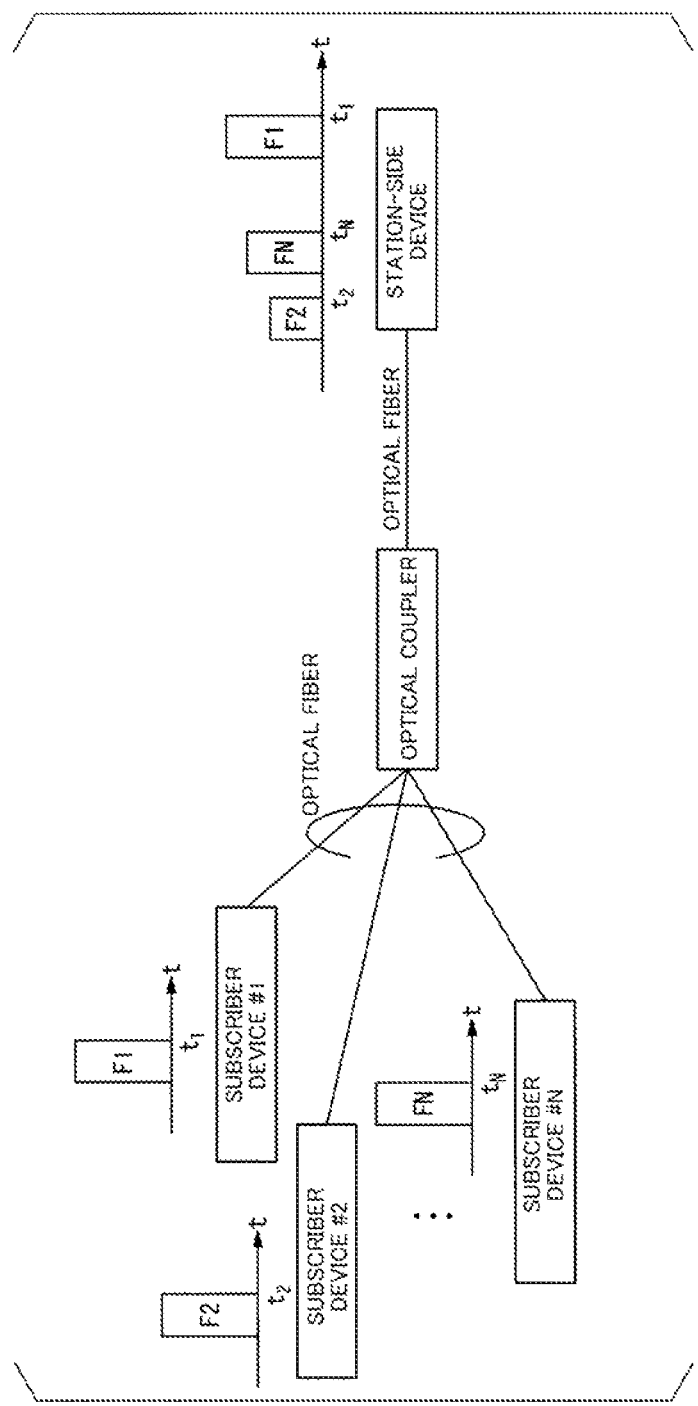
FIG. 9 is a diagram illustrating an upstream communication in an optical subscriber access network.
Figure 10:
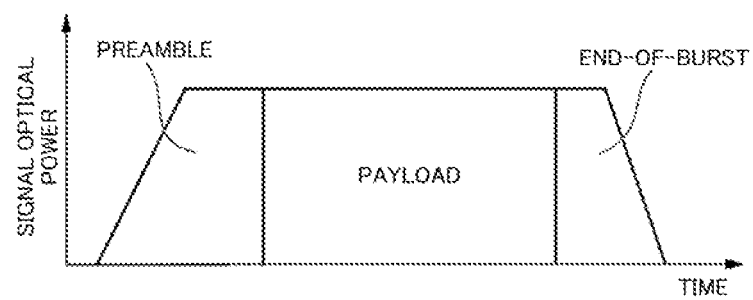
FIG. 10 is a diagram illustrating a frame of a burst signal.
Figure 11:
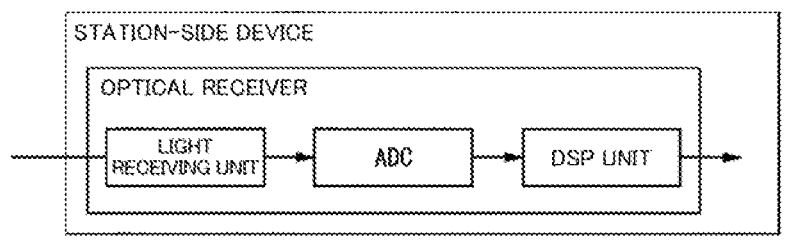
FIG. 11 is a diagram illustrating a configuration of an existing optical receiver.
Figure 12:
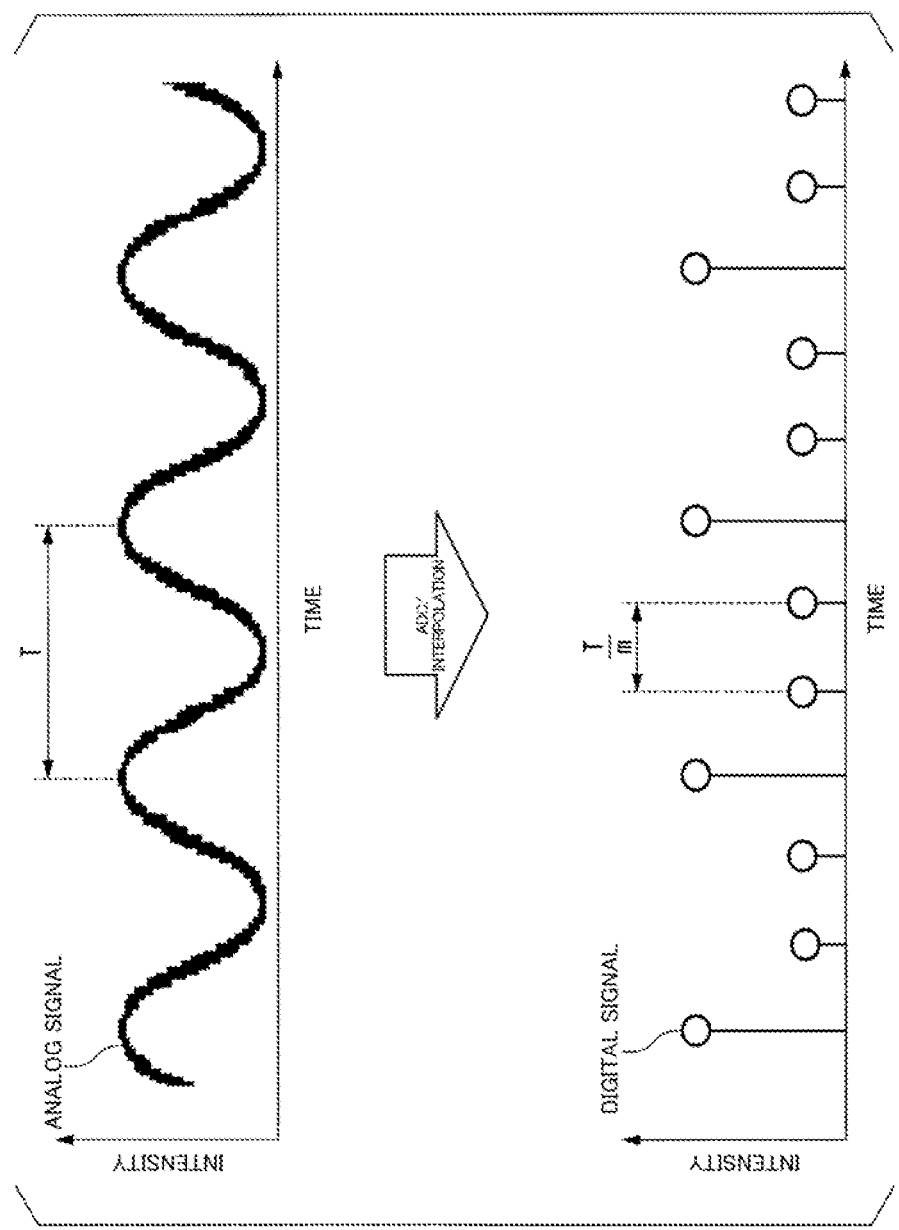
FIG. 12 is a diagram illustrating oversampling.
Figure 13:
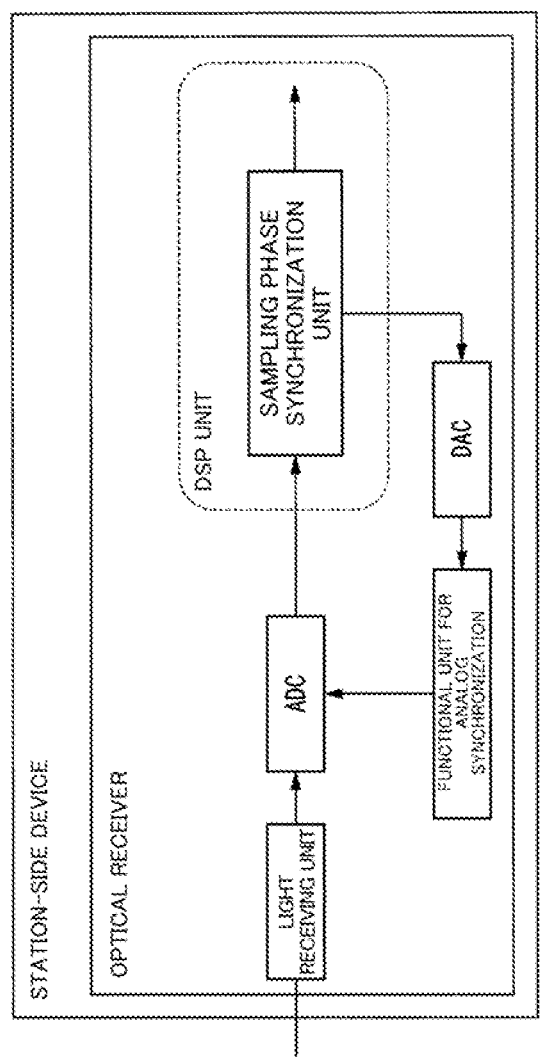
FIG. 13 is a diagram illustrating a configuration of an existing optical receiver that absorbs a clock frequency difference.

FIG. 3 is a diagram illustrating a configuration example of an optical receiver 1 according to a first embodiment. Note, in this drawing, components and functions not directly relevant to this embodiment are omitted. The optical receiver 1 illustrated in this drawing is equipped in a station-side device of a TDM-PON, for example, illustrated in FIG. 8. The optical receiver 1 equipped with the technique of this embodiment includes a light receiving unit 11, an ADC 12, and a DSP unit 13. The optical receiver 1 may include a plurality of ADCs 12.

The light receiving unit 11 receives light and converts the optical signal into an electrical signal. The ADC 12 performs analog-to-digital conversion of the electrical signal converted by the light receiving unit 11 and inputs the signal to the DSP unit 13. The digital signal is a sampling signal composed of time series samples acquired by oversampling. The sampling timing for the ADC 12 to perform oversampling is based on a timing, for example, generated by multiplying the oscillation frequency of a clock (not shown) provided to the optical receiver 1 (or the station-side device).

The DSP unit 13 is one example of a signal processing unit. The DSP unit 13 includes a frame detection unit 131, a symbol timing detection unit 132, a symbol timing adjusting unit 133, and an adaptive equalization filter 134. First, the frame detection unit 131 detects a burst frame of a signal input to the DSP unit 13. Namely, the frame detection unit 131 detects arrival of a new burst frame in a no-signal condition. After that, the burst frame is input to the adaptive equalization filter 134 via the symbol timing detection unit 132 and the symbol timing adjusting unit 133. The symbol timing detection unit 132 and the symbol timing adjusting unit 133 are the functional units that carry out the operations of optimizing symbol timing illustrated in FIG. 1 and FIG. 2.

The light receiver used as the light receiving unit 11 may be a DD unit, or a coherent detection unit. When using a coherent detection unit as the light receiver, or when using polarization diversity, polarization division multiplexing and the like in combination, the number of outputs from the light receiver is increased, so that the number of ADCs 12 and the number of input signals to the DSP unit 13 are increased in accordance therewith.

The symbol timing detection unit 132 detects a symbol timing of an oversampled input signal. Various detection methods have been proposed, and applicable methods vary depending on the modulation scheme of the target signal and the like. For example, where a modulation scheme in which some symbol timing samples have a larger amplitude A than other samples (such as BPSK (Binary Phase Shift Keying) or QPSK) is adopted, the symbol timing detection unit 132 may use a MAM (Maximum Amplitude Method). The MAM is described, for example, in the following reference literature.

(Reference Literature) Seiichi Sampei, et al. "16QAM/TDMA no tameno Sinboru Taimingu Saisei Housiki (Symbol Timing Synchronization Scheme for 16QAM/TDMA systems)", Review of the communications research laboratory, June 1995, Vol. 41, No. 2, p. 189-196.

Figure 4:
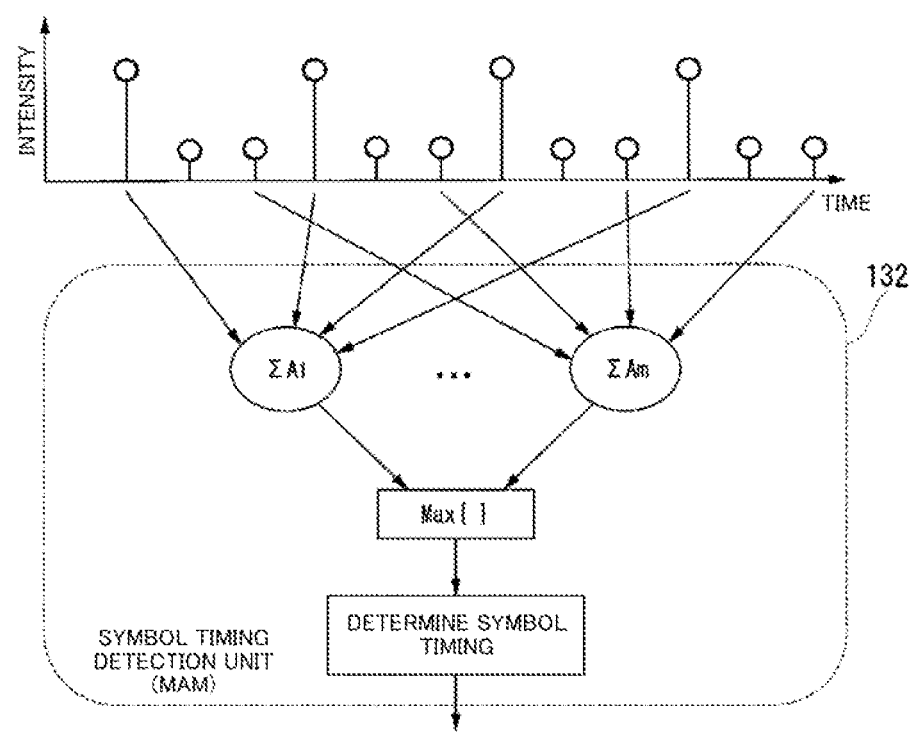
FIG. 4 is a diagram illustrating the processing for detecting a symbol timing performed by a symbol timing detection unit according to this embodiment.

FIG. 4 is a diagram illustrating the processing for detecting a symbol timing performed by the symbol timing detection unit 132. The symbol timing detection process illustrated in this drawing uses the MAM. The MAM calculates statistic values such as a mean value of amplitudes or a value that indicates the same tendency as the mean value (e.g., total sum) separately for each m samples, and, based on the statistic values, determines a timing at which a sample having a maximum mean value among m samples appears as the symbol timing. For example, the symbol timing detection unit 132 obtains and sums up amplitudes A of j+m×(n−1)th samples (n=1, 2, . . . ), where j is an integer of 1 or more and m or less to determine total sums $\Sigma A_j$. The symbol timing detection unit 132 selects a maximum (max) total sum $\tau A_k$ (j being an integer of 1 or more and m or less) from the total sums $\tau A_1$ to $\tau A_m$. The symbol timing detection unit 132 thus detects a timing at which the symbol used for the calculation of the selected maximum total sum $\tau A_j$ was obtained as the symbol timing.

Figure 5:
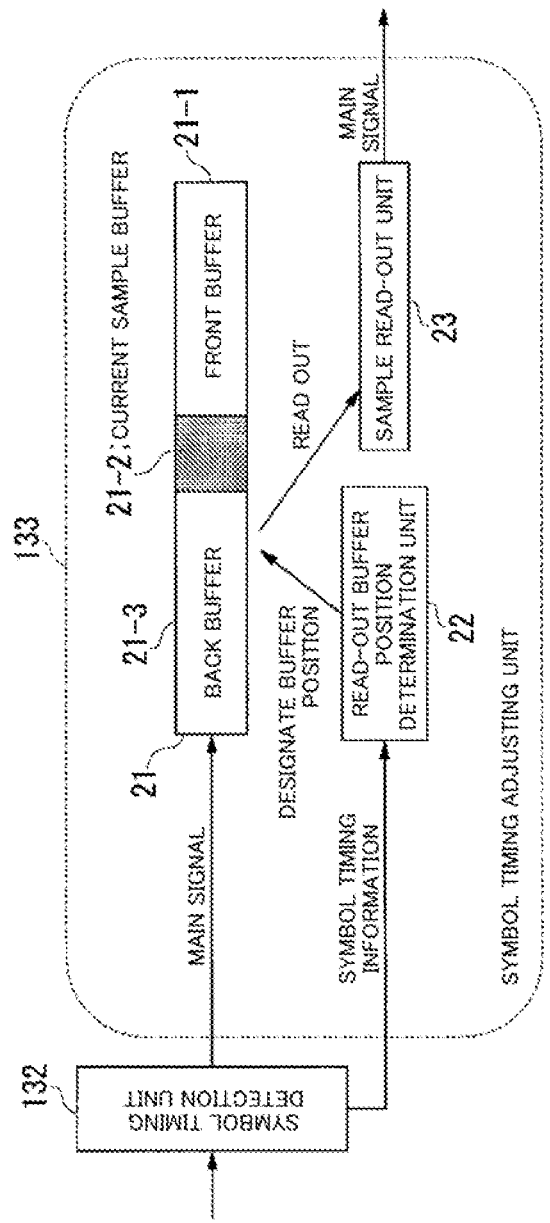
FIG. 5 is a diagram illustrating a configuration example of a symbol timing adjusting unit according to this embodiment.

FIG. 5 is a diagram illustrating a configuration example of the symbol timing adjusting unit 133. The symbol timing adjusting unit 133 may be configured as illustrated in FIG. 5. In FIG. 5, for the sake of simplicity, a situation where serial signal processing is performed to a main signal at the same rate as the sampling rate. The symbol timing adjusting unit 133 includes a buffer 21, a read-out buffer position determination unit 22, and a sample read-out unit 23. The buffer 21 is composed of a front buffer 21-1, a current sample buffer 21-2, and a back buffer 21-3. The front buffer 21-1 is positioned before the current sample buffer 21-2, and the back buffer 21-3 is positioned after the current sample buffer 21-2. The current sample buffer 21-2 stores 1 sample, and the front buffer 21-1 and back buffer 21-3 each store multiple samples.

A main signal and symbol timing information that indicates a detected symbol timing are input from the symbol timing detection unit 132 to the symbol timing adjusting unit 133. The buffer 21 stores the main signal input to the symbol timing adjusting unit 133 in the order of arrival, and advances the samples stored in the buffer 21 one by one each time one sampling time passes. Namely, each time one sampling time passes, the buffer 21 moves the storage position (hereinafter, simply "position") of each stored sample toward the head direction by one sample. The buffer 21 stores the sample that has newly arrived in the last position of the buffer 21 (back buffer 21-3). Meanwhile, the symbol timing information output from the symbol timing detection unit 132 is input to the read-out buffer position determination unit 22. The read-out buffer position determination unit 22 monitors the symbol timing to check if the symbol timing is appearing at an expected constant interval as illustrated in FIG. 14 with reference to the symbol timing information. The read-out buffer position determination unit 22 determines the position of the buffer 21 storing the main signal from which the signal is to be read out, based on the monitoring results.

For example, if the symbol timing of a burst frame is appearing at an expected interval all the time since the start of signal processing, the read-out buffer position determination unit 22 sets a designated position of the buffer at the current sample buffer 21-2. This causes the sample read-out unit 23 to always read out the sample from the current sample buffer 21-2 for every symbol timing, and sends the same to a next signal processing block as a main signal. This symbol timing is based on a timing with a time interval T, for example, generated by multiplying the oscillation frequency of a clock (not shown) provided to the optical receiver 1 (or the station-side device). This symbol timing is a frequency that is 1/m times as high as the timing at which the ADC 12 performs oversampling. In this case, while there occurs a delay until the buffer 21 is filled with signals, the operation is the same as outputting the main signal as is without passing through the symbol timing adjusting unit 133.

Next, FIG. 1 shows a case where the next symbol timing appears at the (m+1)th sample after one symbol timing. In this case, the sample of the symbol timing is supposed to be stored at a position of the buffer 21 shifted to the back side by one from the current sample buffer 21-2 at the timing when the m-th sample is being stored in the current sample buffer 21-2. Therefore, the read-out buffer position determination unit 22 sets a position in the back buffer 21-3 shifted to the back side by one from the current sample buffer 21-2, rather than the current sample buffer 21-2, as the designated position of the buffer 21. The sample read-out unit 23 reads out the sample from the designated position in the back buffer 21-3 at the symbol timing. Thus the sample read-out unit 23 can skip 1 sample when reading out samples from the buffer 21 so that the following samples to be processed are shifted by 1 sample each. Namely, the operation whereby one sample is skipped as illustrated in FIG. 1 is made possible. After that, if the next symbol timing appears at the expected interval, the read-out buffer position determination unit 22 keeps designating the position in the back buffer 21-3 that is shifted to the back side by one from the current sample buffer 21-2, and when the symbol timing appears at an interval of m+1 samples again, the read-out buffer position determination unit 22 shifts the buffer position to be designated to the back side further by one.

Next, FIG. 2 shows a case where the next symbol timing appears at the (m−1)th sample, as opposed to above, after one symbol timing. In this case, the sample of the symbol timing is supposed to be stored at a position in the buffer 21 shifted to the front side by one from the current sample buffer 21-2 at the timing when the m-th sample is being stored in the current sample buffer 21-2. Therefore, the read-out buffer position determination unit 22 sets a position in the front buffer 21-1 shifted to the front side by one from the current sample buffer 21-2, rather than the current sample buffer 21-2, as the designated position of the buffer 21. The sample read-out unit 23 reads out the sample from the designated position in the front buffer 21-1 at the symbol timing. Thus the sample read-out unit 23 can read out samples from the buffer 21 such that the samples after one symbol timing, i.e., the samples in the current sample buffer 21-2 and back buffer 21-3, are delayed by one sample, and the sample of the symbol timing, i.e., the sample immediately before the sample in the current sample buffer 21-2, is duplicated and inserted. Namely, the operation whereby the same sample is read out in duplicate as illustrated in FIG. 2 is made possible. After that, if the next symbol timing appears at the expected interval, the read-out buffer position determination unit 22 keeps designating the position in the front buffer 21-1 that is shifted to the front side by one from the current sample buffer 21-2, and when the symbol timing appears at an interval of m−1 samples again, the read-out buffer position determination unit 22 shifts the buffer position to be designated to the front side further by one.

The operations above are combined, i.e., the read-out buffer position determination unit 22 initially sets the read-out buffer position at the current sample buffer 21-2 at the start of signal processing of one burst frame. The read-out buffer position determination unit 22 does not change the buffer position if the interval of the symbol timing is m samples. When the interval is detected to be m+1 samples, the read-out buffer position determination unit 22 shifts the buffer position to the back side from the current position by one. When the interval is detected to be m−1 samples, the read-out buffer position determination unit 22 shifts the buffer position to the front side from the current position by one. The read-out buffer position determination unit 22 repeats the operations described above. This allows the main signal output from the sample read-out unit 23 always to be a signal in which the symbol timing appears every m samples.

The sizes B(s) of the front buffer 21-1 and back buffer 21-3 are each determined in accordance with the following equation (1) using an allowable magnitude of sampling frequency discrepancy Fd(Hz) and a burst frame length L(s).

$$B = L \cdot Fd \quad (1)$$

Clock frequency discrepancies cannot be compensated if burst frames and sampling frequency discrepancies are such that the buffer size exceeds the above.

Second Embodiment

The symbol timing detection process of the first embodiment is applicable to cases where a modulation scheme is adopted in which some symbol timing samples have a larger amplitude A than other samples (such as BPSK or QPSK). This embodiment, on the other hand, is applicable to cases where a modulation scheme is adopted in which some symbol timing samples have a larger variance or standard deviation of amplitude A than other samples (such as OOK). Below, the difference from the first embodiment will be described. The configuration of the optical receiver of this embodiment is the same as that of the first embodiment.

Figure 6:
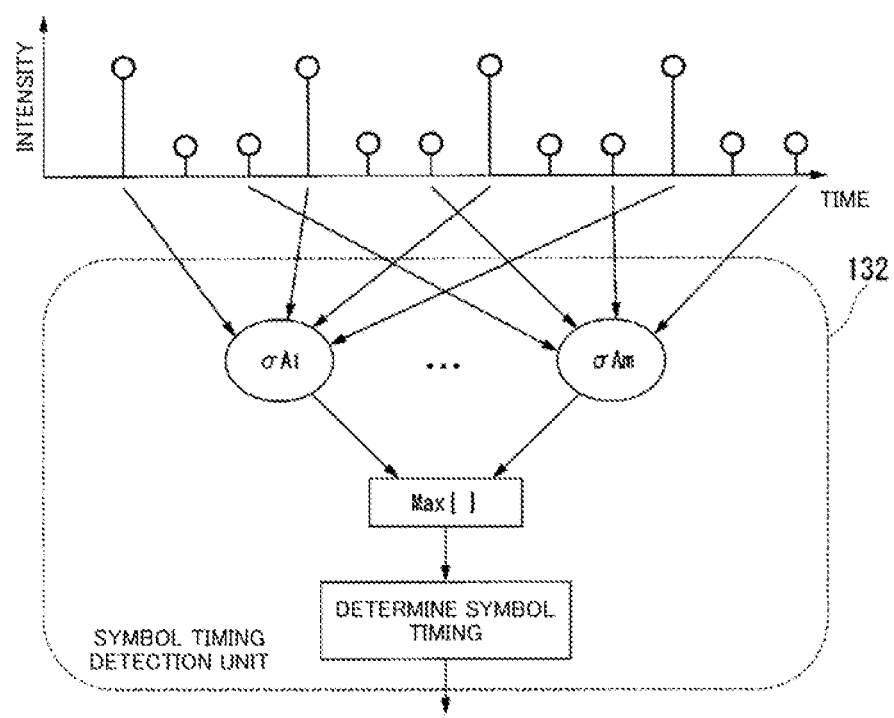
FIG. 6 is a diagram illustrating the processing for detecting a symbol timing performed by a symbol timing detection unit according to a second embodiment.

FIG. 6 is a diagram illustrating the processing for detecting a symbol timing performed by the symbol timing detection unit 132 of this embodiment. The symbol timing detection unit 132 calculates variances or standard deviations of amplitude, or values that indicate the same tendency as these separately for each m samples, and determines a sample having a maximum variance or standard deviation of amplitude among m samples as the symbol timing. In FIG. 6, the symbol timing detection unit 132 obtains amplitudes A of j+m×(n−1)th samples (n=1, 2, . . . ), where j is an integer of 1 or more and m or less to determine standard deviations $\sigma A_j$. The symbol timing detection unit 132 selects a maximum standard deviation $\sigma A_j$ (j being an integer of 1 or more and m or less) from standard deviations $\sigma A_1$ to $\sigma A_m$. The symbol timing detection unit 132 thus detects a timing at which the symbol used for the calculation of the selected maximum $\sigma A_j$ was obtained as the symbol timing.

Third Embodiment

In the first embodiment, as illustrated in FIG. 3, oversampling is performed by the ADC 12. In this embodiment, after the oversampling by the ADC, an interpolation process is performed by the DSP. An "interpolation process" is a known technique synonymous to "interpolation", for estimating values at points between the sample points acquired by the ADC. Below, the difference from the first embodiment and the second embodiment will be described.

Figure 7:
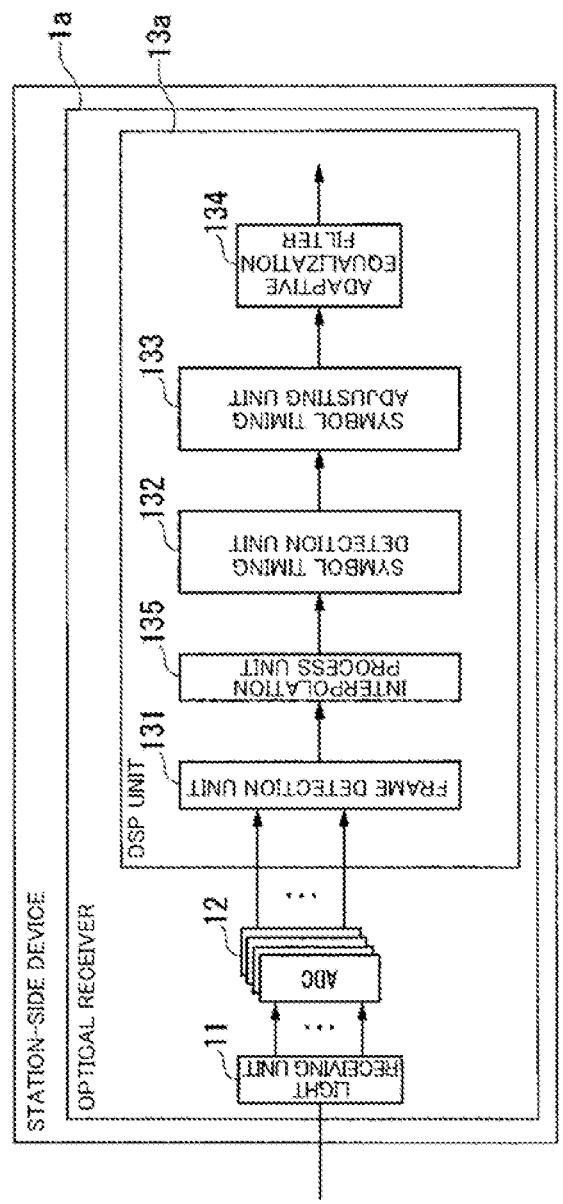
FIG. 7 is a diagram illustrating a configuration example of a symbol timing adjusting unit according to a third embodiment.

FIG. 7 is a diagram illustrating a configuration example of an optical receiver 1a according to the third embodiment. In FIG. 7, the same symbols are given to the same parts as the optical receiver 1 according to the first embodiment illustrated in FIG. 3 to omit the description thereof. The optical receiver 1a illustrated in this drawing differs from the optical receiver 1 illustrated in FIG. 3 in that it has a DSP unit 13a instead of the DSP unit 13. The DSP unit 13a has a configuration in which an interpolation process unit 135 is added between the frame detection unit 131 and the symbol timing detection unit 132 of the DSP unit 13 illustrated in FIG. 3. The interpolation process unit 135 performs an interpolation process to the results of oversampling by the ADC 12, to further increase sample points by estimating values between sample points, to achieve a desired value of sampling rate. The symbol timing detection unit 132 and symbol timing adjusting unit 133 perform the same processing as the first embodiment or the second embodiment to a symbol signal (digital signal) that contains symbols of sample points augmented by the interpolation process unit 135 from the samples obtained by oversampling performed by the ADC 12.

According to the embodiments described above, the optical receiver includes a light receiving unit, a conversion unit (e.g., ADC 12), and a signal processing unit (e.g., DSP unit 13 or 13a). The light receiving unit receives and converts an optical signal into an electrical signal. The conversion unit oversamples the received signal that has been converted into the electrical signal to generate a sample signal composed of time series samples. The signal processing unit includes a symbol timing detection unit and a symbol timing adjusting unit. The symbol timing detection unit detects a symbol timing in the sample signal. When it is determined that a symbol timing is appearing at a longer interval than a predetermined interval based on a detection result of the symbol timing detection unit, the symbol timing adjusting unit skips one or more samples included in the sample signal to read out the samples at the predetermined interval. When it is determined that a symbol timing is appearing at a shorter interval than the predetermined interval based on the detection result of the symbol timing detection unit, the symbol timing adjusting unit inserts the same samples as one or more samples included in the sample signal immediately after the sample(s) to read out the samples at the predetermined interval. The operations above allow the signal processing unit to realize the adjustment function whereby the symbol timing appears at a predetermined interval. The predetermined interval is a time interval based on, for example, a frequency of a signal supplied from a clock equipped in the optical receiver.

The symbol timing adjusting unit may be configured to include a buffer, a read-out buffer position determination unit, and a sample read-out unit. The buffer stores the sample signal in an order of received time. The read-out buffer position determination unit determines whether the symbol timing is appearing in the sample signal at a longer or a shorter interval than a predetermined interval based on a detection result of the symbol timing detection unit. The read-out buffer position determination unit changes the buffer position from which the sample read-out unit reads out the sample in accordance with the determination result.

The signal processing unit may further include an interpolation process unit that estimates values of samples between the samples included in the sample signal. The symbol timing detection unit detects a symbol timing based on the samples included in the sample signal and the samples estimated by the interpolation process unit.

The symbol timing detection unit may calculate a statistic value of amplitudes of a sample group composed of samples per predetermined number of sample intervals contained in the sample signal, for each symbol group shifted by one sample each, and may detect the symbol timing based on the calculation result.

In a TDM-PON used for an optical access network, when a station-side device receives an upstream burst signal, a function to compensate for a discrepancy, if any, in clock frequency between a subscriber device that is the transmitter and a station-side device that is the receiver is required. Sampling phase compensation by an analog circuit that is mainly used in a core/metro system can hardly be applied as is because of the slow response speed. Burst CDR used in existing PONS cannot be supported because the modulation method is different. The signal processing unit of this embodiment performs processing to the sample signal or digital signal obtained by oversampling such that the symbol timing always appears at a desired interval by skipping one sample signal, or by inserting the same sample signal immediately after this sample signal. Application of an optical receiver equipped with the signal processing unit of this embodiment to a station-side device allows for compensation of a clock frequency difference between a subscriber device and the station-side device for burst signals that use OOK or phase modulation.

While the embodiments of this invention have been described in detail with reference to the drawings above, specific configurations are not limited to the embodiments and shall include designs or the like that are within the scope not departing from the subject matter of the invention.

INDUSTRIAL APPLICABILITY

Applicable to optical receivers that receive burst frames.

REFERENCE SIGNS LIST 1, 1a Optical receiver
11 Light receiving unit
12 ADC
13, 13a DSP unit
131 Frame detection unit
132 Symbol timing detection unit
133 Symbol timing adjusting unit
134 Adaptive equalization filter
135 Interpolation process unit
21 Buffer
21-1 Front buffer
21-2 Current sample buffer
21-3 Back buffer
22 Read-out buffer position determination unit
23 Sample read-out unit

The invention claimed is:
1. A signal processing unit, comprising:
a processor; and
a storage medium having computer program instructions stored thereon, when executed by the processor, perform to:
detect a symbol timing in a sample signal composed of time series samples obtained by oversampling a received signal and that the symbol timing does not appear at a predetermined interval, and wherein the predetermined interval is m samples where m is an integer greater than one, and when it is determined that the symbol timing is appearing at a longer interval than the predetermined interval based on a detection result, skip one or more samples included in the sample signal to read out the samples at the predetermined interval and cause the symbol timing to appear at the predetermined interval, when it is determined that the symbol timing is appearing at a shorter interval than the predetermined interval based on the detection result, insert the same sample one or more times in the sample signal to read out the samples at the predetermined interval and cause the symbol timing to appear at the predetermined interval.

2. The signal processing unit according to claim 1, wherein the computer program instructions further perform to store the sample signal in an order of received time, determines whether the symbol timing is appearing at a longer or a shorter interval than the predetermined interval based on the detection result, and change buffer position from which the sample is read out from the buffer in accordance with a determination result, and reads out the sample from the buffer position.

3. The signal processing unit according to claim 1, wherein the computer program instructions further perform to estimate values of samples between the samples included in the sample signal, and detect the symbol timing based on the samples included in the sample signal and the estimated samples.

4. The signal processing unit according to claim 1, wherein the computer program instructions further perform to calculate a statistic value of amplitudes of a sample group composed of samples per predetermined number of sample intervals contained in the sample signal, for each sample group shifted by one sample each, and detect the symbol timing based on a calculation result.

5. An optical receiver comprising: a light receiving unit that receives and converts an optical signal into an electrical signal; a conversion unit that generates a sample signal composed of time series samples obtained by oversampling the electrical signal; and the signal processing unit according to claim 1.

6. A signal processing unit, comprising:
a symbol timing detection unit that detects a symbol timing in a sample signal composed of time series samples obtained by oversampling a received signal and that the symbol timing does not appear at a predetermined interval,
wherein the predetermined interval is m samples where m is an integer greater than one; and
a symbol timing adjusting unit that:
when it is determined that the symbol timing is appearing at a longer interval than the predetermined interval based on a detection result of the symbol timing detection unit, skips one or more samples included in the sample signal to read out the samples at the predetermined interval and cause the symbol timing to appear at the predetermined interval; and
when it is determined that the symbol timing is appearing at a shorter interval than the predetermined interval based on the detection result, inserts the same sample one or more times in the sample signal to read out the samples at the predetermined interval and cause the symbol timing to appear at the predetermined interval.

7. The signal processing unit according to claim 6, wherein the symbol timing adjusting unit includes a buffer that stores the sample signal in an order of received time, a read-out buffer position determination unit that determines whether the symbol timing is appearing at a longer or a shorter interval than the predetermined interval based on the detection result, and changes a buffer position from which the sample is read out from the buffer in accordance with a determination result, and a sample read-out unit that reads out the sample from the buffer position.

8. The signal processing unit according to claim 6, further comprising an interpolation process unit that estimates values of samples between the samples included in the sample signal, wherein the symbol timing detection unit detects the symbol timing based on the samples included in the sample signal and the estimated values of the samples.

9. The signal processing unit according to claim 6 wherein the symbol timing detection unit calculates a statistic value of amplitudes of a sample group composed of samples per predetermined number of sample intervals contained in the sample signal, for each sample group shifted by one sample each, and detects the symbol timing based on a calculation result.

10. An optical receiver comprising: a light receiving unit that receives and converts an optical signal into an electrical signal; a conversion unit that generates a sample signal composed of time series samples obtained by oversampling the electrical signal; and the signal processing unit according to claim 6.

11. A signal processing method performed on one or more processors, comprising:
detecting a symbol timing in a sample signal composed of time series samples obtained by oversampling a received signal and that the symbol timing does not appear at a predetermined interval,
wherein the predetermined interval is m samples where m is an integer greater than one;
when it is determined that the symbol timing is appearing at a longer interval than the predetermined interval based on a detection result of the symbol timing detection unit, skipping one or more samples included in the sample signal to read out the samples at the predetermined interval and cause the symbol timing to appear at the predetermined interval; and
when it is determined that the symbol timing is appearing at a shorter interval than the predetermined interval based on the detection result, inserting the same sample one or more times in the sample signal to read out the samples at the predetermined interval and cause the symbol timing to appear at the predetermined interval.

12. The signal processing method according to claim 11 further comprising:
storing the sample signal in an order of received time;
determining whether the symbol timing is appearing at a longer or a shorter interval than the predetermined interval based on the detection result;
changing a buffer position from which the sample is read out from the buffer in accordance with a determination result; and
reading out the sample from the buffer position.

13. The signal processing method according to claim 11, further comprising estimating values of samples between the samples included in the sample signal, and detecting the symbol timing based on the samples included in the sample signal and the estimated values of the samples.

14. The signal processing method according to claim 11 further comprising calculating a statistic value of amplitudes of a sample group composed of samples per predetermined number of sample intervals contained in the sample signal, for each sample group shifted by one sample each, and detecting the symbol timing based on a calculation result.

15. A method according to claim 11 further comprising:
receiving and converting an optical signal into an electrical signal;
generating the sample signal composed of time series samples obtained by oversampling the electrical signal.

* * * * *